(12) United States Patent
Onodera

(10) Patent No.: US 10,389,220 B2
(45) Date of Patent: Aug. 20, 2019

(54) FORCE SENSE GENERATOR

(71) Applicant: ALPS ALPINE CO., LTD., Tokyo (JP)

(72) Inventor: Mikio Onodera, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 207 days.

(21) Appl. No.: 15/720,178

(22) Filed: Sep. 29, 2017

(65) Prior Publication Data

US 2018/0026512 A1    Jan. 25, 2018

Related U.S. Application Data

(63) Continuation of application No. PCT/JP2016/059418, filed on Mar. 24, 2016.

(30) Foreign Application Priority Data

Apr. 21, 2015  (JP) .................................. 2015-086719

(51) Int. Cl.
*H02K 41/02*    (2006.01)
*H02K 35/02*    (2006.01)
(Continued)

(52) U.S. Cl.
CPC ........... *H02K 35/02* (2013.01); *G06F 3/0362* (2013.01); *H02K 7/1876* (2013.01); *H02K 33/00* (2013.01); *H02K 35/04* (2013.01)

(58) Field of Classification Search
CPC ....... H02K 7/1786; H02K 33/00; H02K 35/02
(Continued)

(56) References Cited

U.S. PATENT DOCUMENTS 6,909,223 B2 *  6/2005  Miyazawa .............. H02N 2/004
                                                     310/15
2007/0210659 A1 *  9/2007  Long ...................... H02K 49/10
                                                     310/80
(Continued)

FOREIGN PATENT DOCUMENTS

JP    2001-317612    11/2001
JP    2004-239408     8/2004
(Continued)

OTHER PUBLICATIONS

International Search Report dated Jun. 21, 2016 in PCT/JP2016/059418 filed on Mar. 24, 2016.

*Primary Examiner* — Hanh N Nguyen
(74) *Attorney, Agent, or Firm* — IPUSA, PLLC

(57) ABSTRACT

A force sense generator includes a rotatable circular plate having a rotation axis at a center of gravity; a motor that drives the circular plate to be rotated; a cam formed at a surface of the circular plate so as to surround the rotation axis; an anchor that is reciprocated along a linear trajectory that is perpendicular to the rotation axis of the circular plate; and a follower provided at the anchor and is moved along the cam, the cam being configured to include a first angle range and a second angle range such that the anchor is moved in opposite directions at different accelerations when the follower moves within the first angle range and when the follower moves within the second angle range, respectively, while the circular plate is rotated in one direction.

4 Claims, 4 Drawing Sheets

(51) Int. Cl.
*H02K 7/18* (2006.01)
*H02K 33/00* (2006.01)
*H02K 35/04* (2006.01)
*G06F 3/0362* (2013.01)

(58) Field of Classification Search
USPC ........................................ 310/20, 80, 12.12
See application file for complete search history.

(56) References Cited

U.S. PATENT DOCUMENTS

2010/0033030 A1   2/2010  Amemiya et al.
2012/0119594 A1*  5/2012  Gosvener ............... H02K 33/16
                                              310/20

FOREIGN PATENT DOCUMENTS

JP    2008-286547   11/2008
JP    2010-210010   9/2010
JP    2012-143054   7/2012
WO    2007/086426   8/2007

* cited by examiner

FORCE SENSE GENERATOR

CROSS-REFERENCE TO RELATED APPLICATION

This application is a continuation application filed under 35 U.S.C. 111(a) claiming the benefit under 35 U.S.C. 120 and 365(c) of PCT International Application No. PCT/JP2016/059418 filed on Mar. 24, 2016, which is based upon and claims priority to Japanese Priority Application No. 2015-086719 filed on Apr. 21, 2015, the entire contents of which are hereby incorporated by reference.

BACKGROUND OF THE INVENTION

The present invention relates to a force sense generator capable of causing to sense a force of a predetermined direction.

Description of the Related Art

Each of Patent Document 1 and Patent Document 2 discloses a force sense generator capable of make an operator sense a force of a predetermined direction by reciprocating an object with a predetermined weight.

The force sense generator of Patent Document 1 includes a flat plate cam in which a circular cam groove is formed, a rotator with a weight, and a cam follower that is rotated along the cam groove with the rotator. The rotator is connected at a rotation center provided inside the cam groove via a coil spring. The cam groove includes a curved surface in which a distance between the rotation center and the cam follower drastically becomes shorter, and a curved surface in which the distance gradually becomes longer. By rotating the rotator and the cam follower along the cam groove, asymmetrical accelerations are generated in a direction in which the coil spring is expanded and a direction in which the coil spring is compressed, and force sense is generated.

The force sense generator of Patent Document 2 includes an elliptical cam that is eccentrically rotated around a rotation axis, and a guide rod that is provided to move upward and downward at a position shifted from the rotation center of the elliptical cam. A lower end of the guide rod contacts a cam surface, which is a side surface of the elliptical cam, and an anchor is fixed at an upper end of the guide rod. When the elliptical cam is eccentrically rotated, asymmetry accelerations can be generated when the guide rod moves upward and when the guide rod moves downward to make an operator sense a force.

However, according to the structure of Patent Document 1, as the rotator with the weight is rotated with the cam follower, another acceleration is also generated in a direction different from a direction of a desired force to be sensed. As such acceleration causes vibration, it is difficult to make an operator extremely sense the force of one direction. For this problem, Patent Document 1 also discloses a structure in which another flat plate cam provided with a similar cam groove is overlapped and provided, while facing downward, to the above described flat plate cam, and a lower cam follower is rotated with a rotator with a weight same as that of the upper rotator in an opposite direction. With this configuration, it is described that the acceleration in the direction different from the direction of the desired force can be compensated. However, in such a structure, as two structures each including a flat plate cam, a rotator and a cam follower are necessary, and also a drive system that separately operates these structures is necessary, the structure becomes complicated. Further, in this structure, in order to compensate the undesired acceleration, it is necessary to move the upper and lower cam followers such that their rotation angles, other than the direction of the desired force to be sensed, are always accurately opposite from each other, and if these rotation angles are sifted even slightly, the acceleration in the direction different from the direction of the desired force to be sensed is not compensated, and vibration is generated.

Further, according to the structure of Patent Document 2, as the elliptical cam is eccentrically rotated, vibration is easily generated and it is difficult to make an operator extremely sense the force of one direction. For this problem, Patent Document 2 also discloses a structure in which an elliptical cam having a shape same as that of the above described elliptical cam is provided on a rotation axis coaxially provided with that of the above described elliptical cam, and is rotated in an opposite direction. With this configuration, it is described that a total sum of vectors of forces generated in directions different from the direction of the desired force to be sensed can be zero. However, in such a structure, as two elliptical cams and drive systems for driving the cams are necessary, the structure becomes complicated. Further, it is necessary to separately and accurately rotate the two elliptical cams in opposite directions, and if rotations of the two elliptical cams are shifted even slightly, the vectors of the forces in the directions other than the direction of the desired force to be sensed are not compensated and vibration is generated.

As such, according to the structures of Patent Document 1 and Patent Document 2, in order to effectively reduce generation of vibration, high-performance control for accurately rotating the two cam followers or the two elliptical cams in opposite directions is necessary.

Patent Document 1: Japanese Laid-open Patent Publication No. 2010-210010
Patent Document 2: WO 2007/086426

SUMMARY OF THE INVENTION

The present invention is made in light of the above problems, and provides a force sense generator capable of making an operator extremely sense a force of one direction by a simple structure.

According to an embodiment, there is provided a force sense generator including a rotatable circular plate having a rotation axis at a center of gravity; a motor that drives the circular plate to be rotated; a cam formed at a surface of the circular plate so as to surround the rotation axis; an anchor that is reciprocated along a linear trajectory that is perpendicular to the rotation axis of the circular plate; and a follower provided at the anchor and is moved along the cam, the cam being configured to include a first angle range and a second angle range such that the anchor is moved in opposite directions at different accelerations when the follower moves within the first angle range and when the follower moves within the second angle range, respectively, while the circular plate is rotated in one direction.

DETAILED DESCRIPTION OF THE PREFERRED EMBODIMENTS

A force sense generator of an embodiment is mounted on a personal digital assistant, a game device or the like, and is capable of making an operator sense a pseud force as if the operator is pulled in a certain direction. The generator is operated by linking with control of various game software such as a fishing game.

Figure 1:
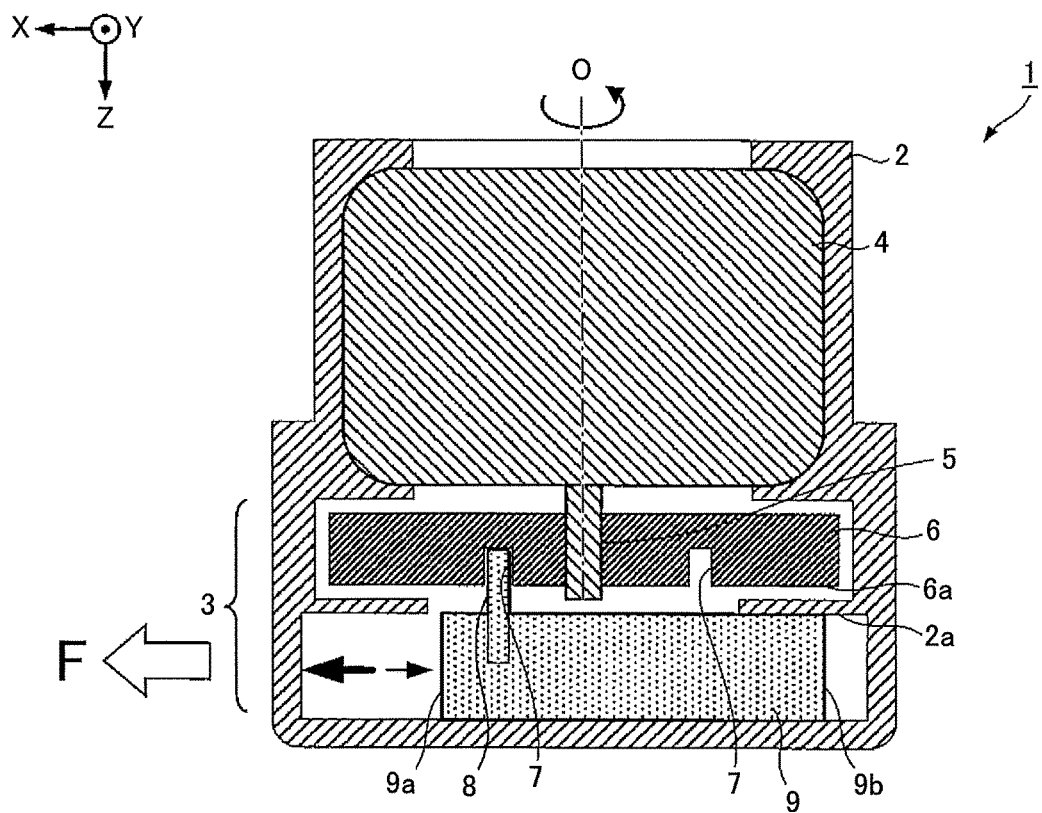
FIG. 1 is a cross-sectional view illustrating an entire structure of a force sense generator of an embodiment.
Figure 2:
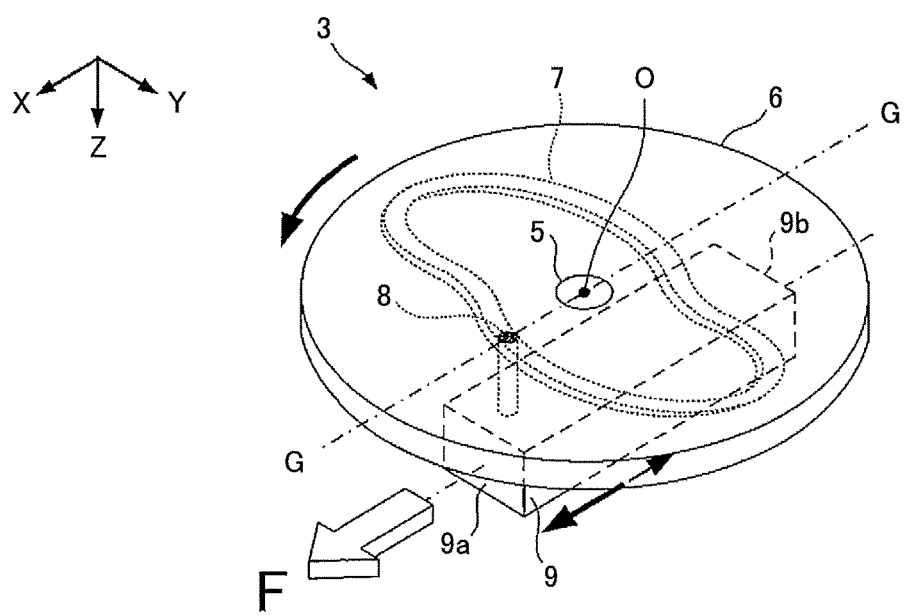
FIG. 2 is a perspective view illustrating a movable portion of a force sense mechanism illustrated in FIG. 1.
Figure 3:
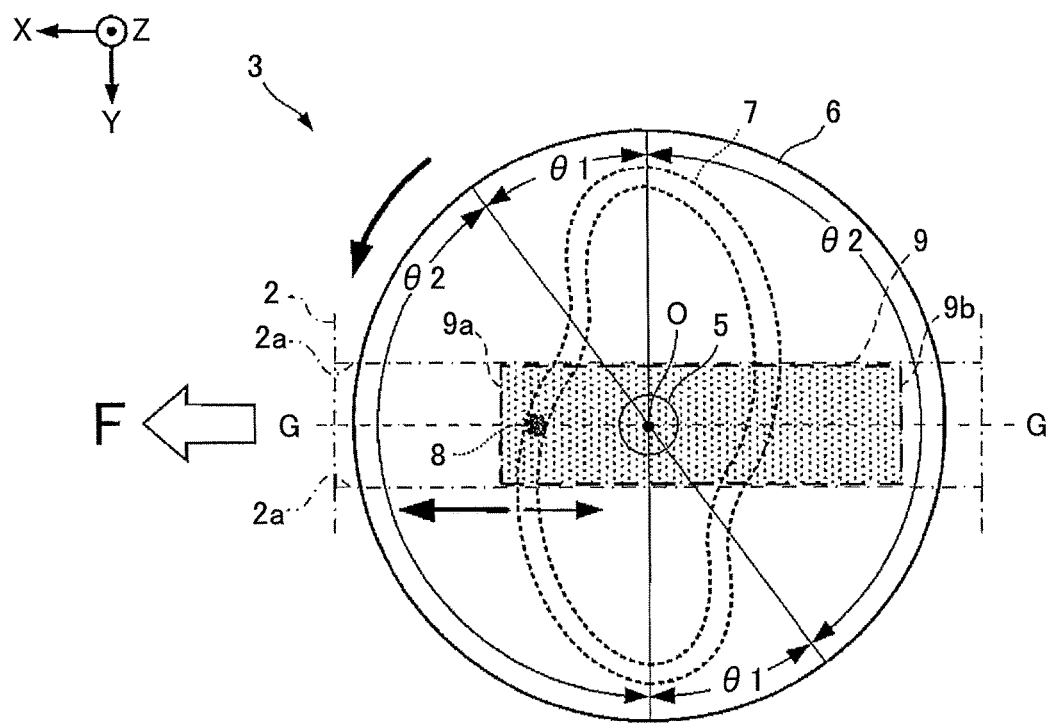
FIG. 3 is a plan view of the force sense mechanism illustrated in FIG. 1.

FIG. 1 is a cross-sectional view illustrating an entire structure of a force sense generator 1 of an embodiment, FIG. 2 is a perspective view of a force sense mechanism illustrated in FIG. 1, and FIG. 3 is a plan view of the force sense mechanism illustrated in FIG. 1.

The force sense generator 1 illustrated in FIG. 1 includes a case 2, a force sense mechanism 3, provided in the case 2, that generates a pseudo force F in an X direction, and a motor 4 that drives the force sense mechanism 3. In this embodiment, the motor 4 is supported in the case 2, and the force sense mechanism 3 is provided at a lower side of the motor 4 in a Z direction. The force sense mechanism 3 is configured to convert a rotational motion of a cam to a reciprocating motion of an anchor on a linear line, and generate the force F that is sensed in one direction by controlling accelerations of the anchor in a forward motion and a backward motion to be asymmetry.

Specifically, as illustrated in FIG. 2, the force sense mechanism 3 includes a circular plate 6 capable of being rotated around a rotation shaft 5 (rotation axis), which is rotated by the motor 4, as a center. The circular plate 6 has a completed round shape, there is almost no mass deviation, and the rotation shaft 5 is set to be a center of gravity. A cam groove 7 that is formed to surround the rotation shaft 5 is formed at one surface of the circular plate 6, at a lower plane 6a here.

An anchor 9 is provided at a lower side of the circular plate 6. The anchor 9 is guided by inner walls 2a, 2a formed inside the case 2 to be movable only along a tracing of a linear line G, and is regulated not to move in directions other than the linear line direction. A pin-like follower 8 is fixed to the anchor 9 near a left-side end portion 9a in FIG. 3, and the follower 8 slides in the cam groove 7.

The linear line G means a moving tracing that passes on a center O of the rotation shaft 5 in the circular plate 6 and also extends in a direction perpendicular to the rotation shaft 5. The follower 8 moves on the linear line G. The linear line G matches a center line that divides a width of the anchor 9 in a Y direction and extends in the X direction. Thus, the anchor 9 that reciprocates in the X direction is configured such that mass deviation in the Y direction is not generated.

Figure 4A:
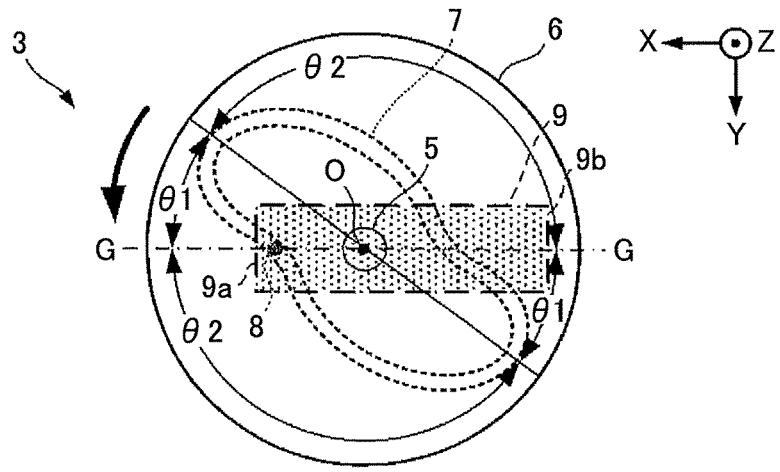
FIG. 4A to FIG. 4C are views for describing an operation of the force sense mechanism illustrated in FIG. 1.
Figure 4B:
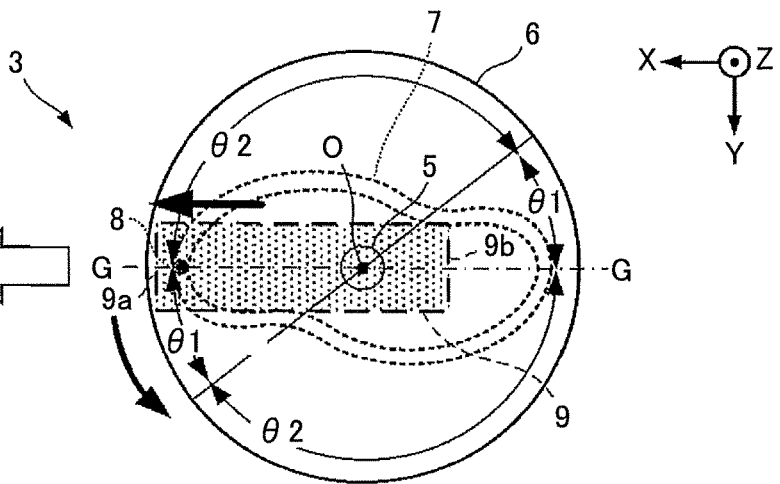
Figure 4C:
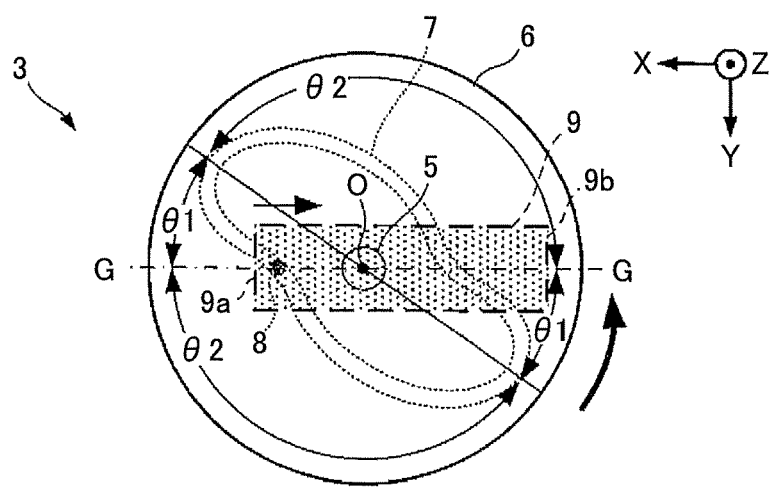

The anchor 9 has a long shape (rectangular shape) and its longer direction is directed in the X direction, which is a moving direction. As illustrated in FIG. 3, the follower 8 is provided near the end portion 9a at a left-side of the anchor 9. As illustrated in FIG. 4A to FIG. 4C, the follower 8 only moves in an area at a left-side of the rotation shaft 5, and an end portion 9b of the anchor 9 at a right-side only moves in an area at a right-side of the rotation shaft 5. In such a structure, it is possible to make the anchor 9 relatively large to increase its weight, and further, the anchor 9 that is reciprocated in the X direction can be prevented from largely protruding from a projection area of the circular plate 6. Further, as illustrated in FIG. 4A to FIG. 4C, it is possible to configure a structure in which the reciprocating anchor 9 does not protrude from the projection area of the circular plate 6.

When the circular plate 6 is rotated, the cam groove 7 is rotated in accordance with the ration of the circular plate 6, and the follower 8 inserted in the cam groove 7 is reciprocated on the linear line G. With this, the anchor 9 is reciprocated in the X direction and its opposite direction.

At this time, by controlling acceleration when the anchor 9 is moved forward in the X direction (forward movement) and acceleration when the anchor 9 is moved backward in the opposite direction (backward movement) to be asymmetry, it is possible to make an operator sense the force F of one direction. In this embodiment, the acceleration when the anchor 9 is moved forward in a left-direction in the drawing is larger than the acceleration when the anchor 9 is moved backward in a right-direction in the drawing, and these movements are repeated.

With this, it is possible to make the operator sense the pseud force F in the X direction. Further, in this embodiment, as the anchor 9 is limited to only linearly move, and the circular plate 6 which hardly has mass deviation is rotated around its center of gravity as a center without rotating the anchor 9, acceleration or a force is not generated in directions other than the direction of the desired force F to be sensed by the operator. Thus, almost no vibration is generated. Therefore, it is possible to make the operator extremely sense only the force F of the X direction.

In this embodiment, such accelerations at a forward movement and a backward movement of the follower 8 and the anchor 9 are defined by a shape of the cam groove 7. FIG. 3 illustrates an example of a structure of the cam groove 7 of the embodiment. The cam groove 7 illustrated in FIG. 3 is configured such that the follower 8 and the anchor 9 are reciprocated twice every time the cam groove 7 is rotated once (every time the circular plate 6 is rotated once). In FIG. 3, an angle range of the cam groove 7 in which the follower 8 and the anchor 9 are moved forward in the left-direction in the drawing is assumed as a first angle range θ1, and an angle range of the cam groove 7 in which the follower 8 and the anchor 9 are moved backward in the right-direction in the drawing is assumed as a second angle range θ2. Here, it is defined that θ1<θ2 and θ1+θ2=180 degrees. In other words, when the follower 8 moves along the cam groove 7 within the first angle range θ1, the follower 8 and the anchor 9 are moved forward in the left-direction in the drawing, and when the follower 8 moves along the cam groove 7 within the second angle range θ2, the follower 8 and the anchor 9 are moved backward in the right-direction in the drawing.

The cam groove 7 is configured by a curve such that acceleration is drastically increased within a short period in the first angle range θ1 (forward movement) and a curve such that acceleration is gradually decreased within a long period in the second angle range (backward movement). In other words, while the circular plate 6 is rotated, a rotation angle necessary for moving the follower 8 for a predetermined distance in a radial direction, where the center is the rotation shaft 5, is sufficiently smaller for the first angle range θ1 than for the second angle range θ2.

Here, the first angle range θ1 (forward movement) and the second angle range θ2 (backward movement) are smoothly continued. According to the cam groove 7 configured as such, variation of the distance between the follower 8 and the center O of the rotation shaft 5 is a movement amount of the anchor 9. At this time, when assuming that the weight of the anchor 9 as "M", an average acceleration of the anchor 9 in the first angle range θ1 as "α1", and an average acceleration of the anchor 9 in the second angle range θ2 as "α2", it is possible to make an operator sense a force of approximately F=Mα1−Mα2 in the X direction every time the follower 8 and the anchor 9 are reciprocated once.

Next, an operation of the force sense generator 1 configured as such is described. FIG. 4A to FIG. 4C are views for describing the operation of the force sense mechanism 3 of the embodiment. FIG. 4A to FIG. 4C illustrate statuses when the circular plate 6 is rotated in a direction illustrated by an arrow. FIG. 4A illustrates a status in which the follower 8 is positioned at a start point of the first angle range θ1. FIG. 4B illustrates a status in which the follower 8 is positioned at a start point of the second angle range θ2 (at an end point of the first angle range θ1). FIG. 4C illustrates a status in which the follower 8 is positioned at an end point of the second angle range θ2 (at a start point of the next first angle range θ1).

When the circular plate 6 is rotated by the motor 4 in the direction of the arrow from the status illustrated in FIG. 4A, the cam groove 7 is rotated in the same direction in accordance with the ration of the circular plate 6, to the status illustrated in FIG. 4C after passing through the status illustrated in FIG. 4B. The anchor 9 is positioned at a rightmost position in the status illustrated in FIG. 4A. During the status illustrated in FIG. 4A to the status illustrated in FIG. 4B, the follower 8 is moved forward with the anchor 9 in the left-direction in the drawing while sliding in the first angle range θ1 of the cam groove 7. At this time, the follower 8 and the anchor 9 are moved in the X direction within a short period by a large acceleration. The anchor 9 is positioned at a leftmost position in the status illustrated in FIG. 4B. Then, during the status illustrated in FIG. 4B to the status illustrated in FIG. 4C, the follower 8 is moved backward with the anchor 9 in the right-direction in the drawing while sliding in the second angle range θ2 of the cam groove 7. At this time, the follower 8 and the anchor 9 are moved in the opposite direction of the X direction by a period longer than that in the first angle range θ1 by acceleration smaller than that in the first angle range θ1. The anchor 9 is positioned at the rightmost position in the status illustrated in FIG. 4C.

As such, when the circular plate 6 is rotated from the status illustrated in FIG. 4A to the status illustrated in FIG. 4C, the circular plate 6 is rotated for 180 degrees, and the follower 8 and the anchor 9 are reciprocated once. Further, when the circular plate 6 is rotated for further 180 degrees, the follower 8 and the anchor 9 are reciprocated once more. At this time, the follower 8 and the anchor 9 are moved forward in the X direction by a larger acceleration within a short period, and are moved backward in an opposite direction of the X direction by acceleration smaller than that by a longer period. While continuously rotating the circular plate 6 by the motor 4, a reciprocating motion in which the follower 8 and the anchor 9 are reciprocated twice per one rotation of the circular plate 6 is repeated. With this, it is possible to make an operator sense the force F in the X direction.

In particular, in this embodiment, as described above, almost no vibration is generated. Thus, it is possible to make the operator extremely sense only the force F in the X direction. Further, as the almost no vibration is generated, different from the conventional structure, it is unnecessary to provide a structure in which two same structures are aligned to be rotated in opposite directions for reducing vibration, and a device structure can be simplified.

Although it is described in this embodiment a case in which the circular plate 6 is rotated in the direction of the arrow of FIG. 3, this is not limited so. The circular plate 6 may be rotated in an opposite direction of the direction of the arrow of FIG. 3. With this, it is possible to make an operator sense a force in an opposite direction of the X direction. Further, by providing a plurality of the force sense generators 1 of the embodiment in different directions, it is possible to make the operator sense a force of a desired direction.

Further, although an example is illustrated as the cam groove 7 illustrated in FIG. 3 in which a combination of the first angle range θ1 at the forward movement and the second angle range θ2 at the backward movement is repeated twice to form one circle, this is not limited so. Angles of the first angle range θ1 and the second angle range θ2 can be independently selectable. In such a case, the cam groove 7 may be formed such that a combination of the first angle range θ1 and second angle range θ2 is repeated three times to form one circle, for example. When the repeated number of the combinations of the first angle range θ1 and the second angle range θ2 is increased, the reciprocating time of the follower 8 and the anchor 9 per rotation of the circular plate 6 can be increased. Further, the cam groove 7 may be formed such that the combination of the first angle range θ1 and the second angle range θ2 forms one circle.

Figure 5:
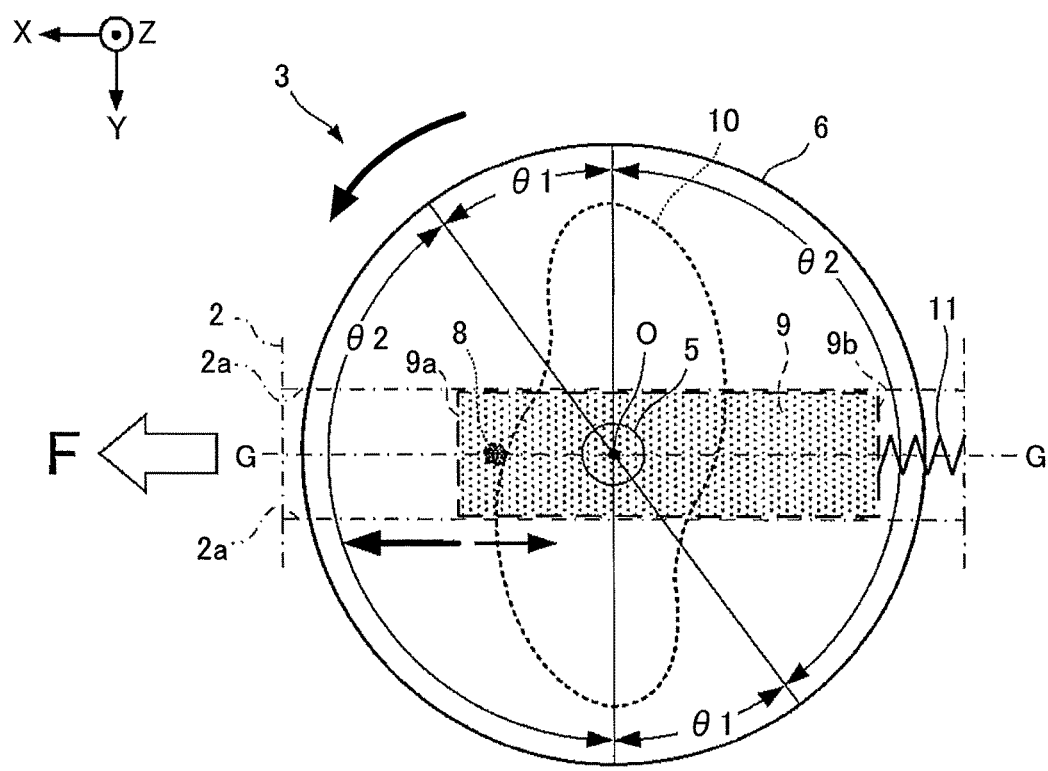
FIG. 5 is a plan view of the force sense mechanism of an alternative example of the embodiment.

Further, although it is described in this embodiment an example in which the cam groove 7 as illustrated in FIG. 3 is formed as a cam formed at one surface of the circular plate 6, this is not limited so. For example, as illustrated in FIG. 5, a protrusion 10, having a curve same as that of the cam groove 7 illustrated in FIG. 3, may be formed at the surface plane 6a of the circular plate 6 to protrude downward to function as a cam. In such a case, as illustrated in FIG. 5, a spring 11 that forces the follower 8 to contact an outline of the protrusion 10 as the cam, may be provided to the anchor 9. With this configuration as well, when the circular plate is rotated in a direction of the arrow, for example, the follower 8 and the anchor 9 are reciprocated by the motor 4 similarly as the above described embodiment. Thus, it is possible to make an operator extremely sense the force F in the X direction.

According to the force sense generator of the embodiment, the follower is reciprocated on the linear line with the anchor by rotation of the cam. As the cam is formed such that accelerations are different within the first angle range in which the follower and the anchor are moved forward, and the second angle range in which the follower and the anchor are moved backward. Thus, it is possible to make an operator sense a force corresponding to a difference between the accelerations of the forward movement and the backward movement of the follower in the direction of the linear line. As the anchor is regulated to move only on the linear line, and the circular plate which hardly has mass deviation is rotated around its center of gravity as a center, acceleration or a force is not generated in directions other than the direction of the desired force to be sensed by the operator, and almost no vibration is generated. Thus, it is possible to make the operator extremely sense a force of only one direction. Further, as almost no vibration is generated, different from the conventional structure, it is unnecessary to provide a structure in which two same structures are aligned to be rotated in opposite directions for reducing vibration, and a device structure can be simplified.

According to the force sense generator of the embodiment, a shape of the cam may be configured such that an angle necessary to move the follower for a predetermined distance in a radial direction of the circular plate is smaller for the first angle range than for the second angle range.

According to the force sense generator of the embodiment, the follower may be provided at one end portion of the anchor in a moving direction, and the follower may be configured to move only at one side of the rotation axis, and another end portion of the anchor is moved only at another side of the rotation axis.

According to the force sense generator of the embodiment, even when the anchor is reciprocated, the moving tracing of the anchor does not largely protrude from an outline of the circular plate, the device can be made into small size.

According to the force sense generator of the embodiment, the cam may include a plurality of combinations, each including the first angle range and the second angle range in this order.

According to the force sense generator of the embodiment, acceleration or a force is not generated in directions other than the direction of the desired force to be sensed by the operator. Thus, almost no vibration is generated, and it is possible to make the operator extremely sense the force of only one direction. Further, as almost no vibration is generated, different from the conventional structure, it is unnecessary to provide a structure in which two same structures are aligned to be rotated in opposite directions for reducing vibration, and a device structure can be simplified.

The invention will be described herein with reference to illustrative embodiments. Those skilled in the art will recognize that many alternative embodiments can be accomplished using the teachings of the present invention and that the invention is not limited to the embodiments illustrated for explanatory purposes.

NUMERALS 1 force sense generator
2 case
2a inner wall
3 force sense mechanism
4 motor
5 rotation shaft
6 circular plate
6a plane
7 cam groove
8 follower
9 anchor
10 protrusion
11 spring
θ1 first angle range
θ2 second angle range

What is claimed is:

1. A force sense generator comprising:
    a rotatable circular plate having a rotation axis at a center of gravity;
    a motor that drives the circular plate to be rotated;
    a cam formed at a surface of the circular plate so as to surround the rotation axis;
    an anchor that is reciprocated along a linear trajectory that is perpendicular to the rotation axis of the circular plate; and
    a follower provided at the anchor and is moved along the cam,
    the cam being configured to include a first angle range and a second angle range such that the anchor is moved in opposite directions at different accelerations when the follower moves within the first angle range and when the follower moves within the second angle range, respectively, while the circular plate is rotated in one direction.

2. The force sense generator according to claim 1, wherein a shape of the cam is configured such that an angle necessary to move the follower for a predetermined distance in a radial direction of the circular plate is smaller for the first angle range than for the second angle range.

3. The force sense generator according to claim 1,
    wherein the follower is provided at one end portion of the anchor in a moving direction, and
    wherein the follower is configured to move only at one side of the rotation axis, and another end portion of the anchor is moved only at another side of the rotation axis.

4. The force sense generator according to claim 1, wherein the cam includes a plurality of combinations, each including the first angle range and the second angle range in this order.

* * * * *